United States Patent
Kawanishi

(10) Patent No.: US 12,476,498 B2
(45) Date of Patent: Nov. 18, 2025

(54) STATOR FOR ROTARY ELECTRIC MACHINE

(71) Applicant: TOYOTA JIDOSHA KABUSHIKI KAISHA, Aichi-ken (JP)

(72) Inventor: Yoshitomo Kawanishi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 469 days.

(21) Appl. No.: 18/180,856

(22) Filed: Mar. 9, 2023

(65) Prior Publication Data
US 2023/0291249 A1 Sep. 14, 2023

(30) Foreign Application Priority Data
Mar. 11, 2022 (JP) .................................. 2022-038438

(51) Int. Cl.
  H02K 3/28 (2006.01)
  H02K 1/14 (2006.01)
  H02K 3/12 (2006.01)
  H02K 3/52 (2006.01)

(52) U.S. Cl.
  CPC ................ *H02K 1/148* (2013.01); *H02K 3/28* (2013.01); *H02K 3/12* (2013.01); *H02K 3/522* (2013.01); *H02K 2203/06* (2013.01)

(58) Field of Classification Search
  CPC ............. H02K 3/12; H02K 3/28; H02K 3/522
  See application file for complete search history.

(56) References Cited

U.S. PATENT DOCUMENTS

| | | | |
|---|---|---|---|
| 8,952,584 B2* | 2/2015 | Asahi ..................... | H02K 5/225 310/71 |
| 9,419,487 B2* | 8/2016 | Yazaki ..................... | H02K 3/28 |
| 2013/0099620 A1* | 4/2013 | Takasaki .................. | H02K 3/38 310/179 |
| 2019/0097484 A1 | 3/2019 | Kaneshige | |

FOREIGN PATENT DOCUMENTS

| | | | |
|---|---|---|---|
| JP | 201941440 A | 3/2019 | |
| JP | 201968494 A | 4/2019 | |
| JP | 2019110676 A | 7/2019 | |
| JP | 2019161716 A | 9/2019 | |
| WO | WO-2018150964 A1 * | 8/2018 | ............... H02K 3/52 |

* cited by examiner

*Primary Examiner* — Gary A Nash
(74) *Attorney, Agent, or Firm* — HAUPTMAN HAM, LLP

(57) ABSTRACT

A stator for a rotary electric machine includes: (a) a stator core; (b) a coil wound on the stator core; (c) a conductive member including: a main line portion that is electrically connected in a longitudinal end portion thereof with an external member; and first and second branch line portions that are branched from a branch portion located on a side of another longitudinal end portion of the main line portion, such that the first branch line portion is connected to the coil through a connection portion; and (d) a resin portion that seals at least a part of a coil end of the coil and at least a part of the second branch line portion.

6 Claims, 5 Drawing Sheets

STATOR FOR ROTARY ELECTRIC MACHINE

This application claims priority from Japanese Patent Application No. 2022-038438 filed on Mar. 11, 2022, the disclosure of which is herein incorporated by reference in its entirety.

FIELD OF THE INVENTION

The present invention relates to a stator for a rotary electric machine, wherein a coil wound on a stator core is electrically connected to a conductive member through a connection portion.

BACKGROUND OF THE INVENTION

There is known a stator for a rotary electric machine, wherein a coil wound on a stator core is electrically connected to a conductive member through a connection portion. There is also known a stator for a rotary electric machine, wherein a power line is connected in an end portion thereof to an external member, and is sealed and fixed in another end portion thereof, and wherein the power line is electrically connected in an intermediate portion thereof between the end portion and the other end portion to a coil. For example, JP-2019-161716A discloses such a stator for a rotary electric machine.

SUMMARY OF THE INVENTION

In the stator of the rotary electric machine disclosed in the above-identified Japanese Patent Application publication, the power line is connected in an end portion thereof to the external member and is fixed in another end portion thereof to a rein portion whereby the power line is fixed in the opposite end portions, so that vibrations of the power line are suppressed. Thus, in the stator of the rotary electric machine disclosed in the Japanese Patent Application publication, it is possible to suppress a magnitude of vibration (e.g., amplitude of the vibration, change rate of the vibration) applied to a connection portion which is provided between the opposite end portions of the power line and which is electrically connected to the coil, so that reliability of the electrical connection in the connection portion can be assured. However, it is desired to further increase the reliability of the electrical connection in the connection portion.

The present invention was made in view of the background art described above. It is therefore an object of the present invention to provide a stator for a rotary electric machine, wherein the stator is capable of increasing reliability of an electrical connection in a connection portion in which a conductive member and a coil are connected.

The object indicated above is achieved according to the following aspects of the present invention.

According to a first aspect of the invention, there is provided a stator for a rotary electric machine. The stator includes: (a) a stator core; (b) a coil wound on the stator core; (c) a conductive member including: a main line portion that is electrically connected in a longitudinal end portion thereof with an external member; and first and second branch line portions that are branched from a branch portion located on a side of another longitudinal end portion of the main line portion, such that the first branch line portion is connected to the coil through a connection portion; and (d) a resin portion that seals at least a part of a coil end of the coil and at least a part of the second branch line portion.

According to a second aspect of the invention, in the stator according to the first aspect of the invention, the second branch line portion includes a sealed region that is sealed by the resin portion and an unsealed region that is not sealed by the resin portion.

According to a third aspect of the invention, in the stator according to the second aspect of the invention, the unsealed region in the second branch line portion has a length that is smaller than a distance between the branch portion and the longitudinal end portion in a longitudinal direction of the main line portion.

According to a fourth aspect of the invention, in the stator according to the second or third aspect of the invention, the second branch line portion includes a plate portion located in the unsealed region, wherein the plate portion of the second branch line portion is bent, such that a thickness direction of the second branch line portion is changed, namely, such that the plate portion includes portions that are different from each other in terms of the thickness direction of the second branch line portion.

According to a fifth aspect of the invention, in the stator according to any one of the second through fourth aspects of the invention, the second branch line portion has a first cross section in the branch portion, and has a second cross section in a boundary between the sealed region and the unsealed region, such that the first and second cross sections are different from each other in shape, and such that the second cross section has a rounded shape.

According to a sixth aspect of the invention, in the stator according to any one of the first through fifth aspects of the invention, the first branch line portion includes a plate portion having a plate surface, wherein the coil includes a plate portion having a plate surface, and wherein the plate surface of the plate portion of the first branch line portion and the plate surface of the plate portion of the coil are electrically connected to each other through welding.

In the stator according to the first aspect of the invention, there are provided: (a) the stator core; (b) the coil wound on the stator core; (c) the conductive member including: the main line portion that is electrically connected in the longitudinal end portion thereof with the external member; and the first and second branch line portions that are branched from the branch portion located on the side of the other longitudinal end portion of the main line portion, such that the first branch line portion is connected to the coil through the connection portion; and (d) the resin portion that seals at least the part of the coil end of the coil and at least the part of the second branch line portion. Thus, the first branch line portion is branched from the branch portion that is located between the longitudinal end portion of the main line portion (connected to the external member) and the second branch line portion (sealed by the resin portion and fixed to the resin portion), and the first branch line portion is electrically connected to the coil through the connection portion. Owing to this arrangement, as compared with an arrangement in which the conductive member includes only the main line portion which is connected in the longitudinal end portion thereof to the external member and which is sealed in the other longitudinal end portion thereof by the resin portion, with an intermediate portion thereof between the longitudinal end portions being electrically connected to the coil, it is possible to suppress a force applied to the connection portion connecting the first branch line portion and the coil in the event of vibration, and to accordingly assure reliability of the electrical connection in the connection portion.

In the stator according to the second aspect of the invention, the second branch line portion includes the sealed region that is sealed by the resin portion and the unsealed region that is not sealed by the resin portion. Owing to provision of the unsealed region in the second branch line portion, as compared with an arrangement in which the unsealed region is not provided in the second branch line portion, the vibration is likely to be absorbed by elastic deformation of the unsealed region in the event of the vibration so that a force applied to a surface of the resin portion is likely to be made smaller. Thus, a crack is unlikely to be caused between the resin portion and the second branch line portion whereby an effect of fixing the second branch line portion to the resin portion is easily maintained, so that it is possible to suppress the force applied to the connection portion connecting the first branch line portion and the coil in the event of vibration, and to accordingly assure reliability of the electrical connection in the connection portion.

In the stator according to the third aspect of the invention, the unsealed region in the second branch line portion has the length that is smaller than the distance between the branch portion and the longitudinal end portion in the longitudinal direction of the main line portion. As compared with the external member to which the longitudinal end portion of the main line portion is connected, the resin portion that seals the coil end is likely to be moved together with the coil. A magnitude of vibration of the branch portion relative to that of the resin portion is made smaller where the length of the unsealed region in the second branch line portion is smaller than the distance between the branch portion and the longitudinal end portion in the longitudinal direction of the main line portion, than where the length of the unsealed region in the second branch line portion is not smaller than the distance between the branch portion and the longitudinal end portion in the longitudinal direction. Therefore, it is possible to suppress the force applied to the connection portion connecting the coil and the first branch line portion branched from the branch portion, and accordingly to easily assure the reliability of the electrical connection in the connection portion.

In the stator according to the fourth aspect of the invention, the second branch line portion includes the plate portion located in the unsealed region, and the plate portion of the second branch line portion is bent, such that the plate portion of the second branch line portion is bent such that the thickness direction of the second branch line portion is changed, namely, such that the plate portion includes the portions that are different from each other in terms of the thickness direction of the second branch line portion. The plate portion is more likely to be elastically deformed in its thickness direction than its longitudinal direction and width direction. Where the plate portion of the unsealed region of the second branch line portion is bent such that the portions of the plate portion are different from each other in terms of the thickness direction, it can be said that the plate portion has a plurality of thickness directions in each of which the plate portion is easily deformed. Therefore, as compared with an arrangement in which the plate portion is not bent, the force applied from the second branch line portion to the surface of the resin portion in the event of the vibration is likely to be smaller, since the plate portion easily absorbs the vibration in a plurality of directions. Thus, the crack is unlikely to be caused between the resin portion and the second branch line portion whereby the effect of fixing the second branch line portion to the resin portion is easily maintained, so that it is possible to suppress the force applied to the connection portion connecting the first branch line portion and the coil in the event of vibration, and to accordingly assure the reliability of the electrical connection in the connection portion.

In the stator according to the fifth aspect of the invention, the shape of the second cross section of the second branch line portion in the boundary between the sealed region and the unsealed region is different from the shape of the first cross section of the second branch line portion in the branch portion, and is rounded. Where the shape of the second cross section of the second branch line portion in the boundary between the sealed region and the unsealed region is rounded as compared with an arrangement in which the shape of the second cross section is not rounded, it is possible to relieve stress concentration occurred due to the force applied from the second branch line portion to the surface of the resin portion in the event of vibration. With the stress concentration occurred on the surface of the resin portion being relieved, the crack is unlikely to be caused between the resin portion and the second branch portion whereby the effect of fixing the second branch line portion to the resin portion is easily maintained, so that it is possible to suppress the force applied to the connection portion connecting the first branch line portion and the coil in the event of vibration, and to accordingly assure reliability of the electrical connection in the connection portion.

In the stator according to the sixth aspect of the invention, the first branch line portion includes the plate portion having the plate surface, the coil includes the plate portion having the plate surface, and the plate surface of the plate portion of the first branch line portion and the plate surface of the plate portion of the coil are electrically connected to each other through the welding. In the plate portion, the plate surface can provide a larger area for connection with another member than its side surface. Where the plate portion of the first branch line portion and the plate portion of the coil are welded in their respective plate surfaces to each other, as compared with an arrangement in which the plate portion of the first branch line portion and the plate portion of the coil are welded in other surfaces to each other, it is possible to obtain a larger area in the connection portion connecting the first branch line portion and the coil, and to accordingly assure reliability of the electrical connection in the connection portion.

DETAILED DESCRIPTION OF PREFERRED EMBODIMENTS

There will be described embodiments of the present invention in details with reference to drawings. It is noted that figures of the drawings are simplified or deformed as needed, and each portion is not necessarily precisely depicted in terms of dimension ratio, shape, angle, etc, for easier understanding of each of the embodiments. Further, in the description of second and third embodiments of the invention, there will be described mainly elements different from those of the first embodiment. The same reference signs as used in the first embodiment will be used in the description of the second and third embodiments, to identify the functionally corresponding elements, and descriptions thereof are not provided. In the following description, "direction parallel to axis CL", "radial direction of stator core 20" and "circumferential direction of stator core 20" will be simply referred to as "direction of the axis CL", "radial direction" and "circumferential direction", respectively.

First Embodiment

Figure 1:
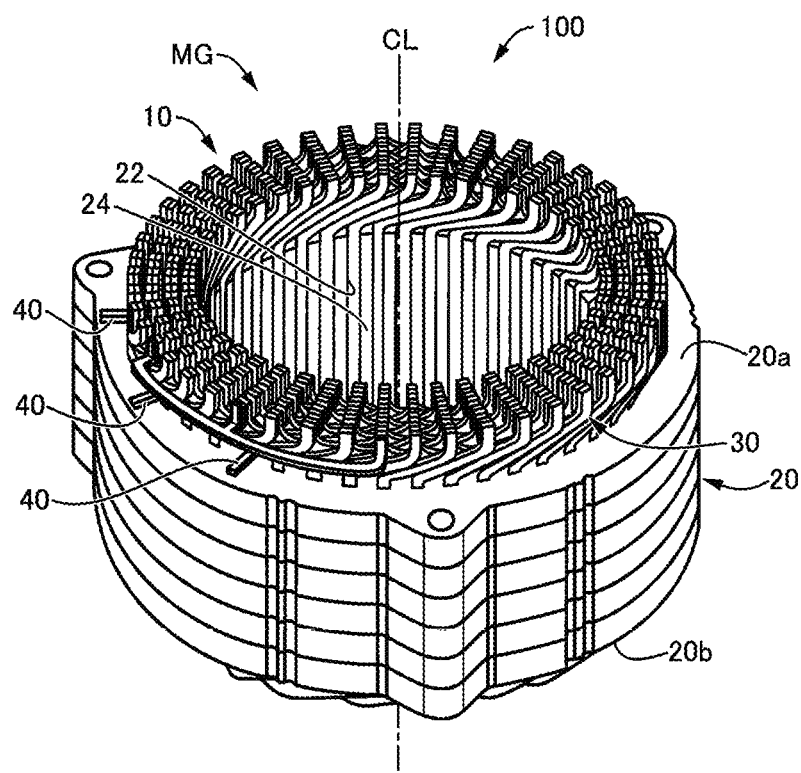
FIG. 1 is a perspective view schematically showing a construction of a stator for a rotary electric machine, wherein the stator is constructed according to a first embodiment of the present invention.

FIG. 1 is a perspective view schematically showing a construction of a stator 10 for a rotary electric machine MG, wherein the stator 10 is constructed according to a first embodiment of the present invention, and is to be provided in a vehicle 100.

The rotary electric machine MG is a rotary electric machine which is provided in the vehicle 100 such as a hybrid vehicle and an electric vehicle and which has a function serving as an electric motor and a function serving as an electric power generator. That is, the rotary electric machine MG is a so-called motor generator. The rotary electric machine MG is a drive power source for driving the vehicle 100, for example. The rotary electric machine MG includes a tubular stator 10 whose center corresponds to an axis CL and a rotor (not shown) that is disposed on an inner peripheral side of the stator 10. The rotor is to be rotated by a rotating magnetic field generated by the stator 10. In FIG. 1, the axis CL is represented by a line extending in a vertical direction in the drawing sheet. However, the axis CL extends in a horizontal direction, for example, in a state in which the rotary electric machine MG is installed in the vehicle 100. It is noted that the horizontal direction in which the axis CL extends in this state does not have to be a strictly horizontal direction but may be inclined with respect to the strictly horizontal direction. That is, the axis CL does not necessarily have to extend in the strictly horizontal direction, as long as the axis CL extends in a direction including a component parallel to the strictly horizontal direction.

Figure 2:
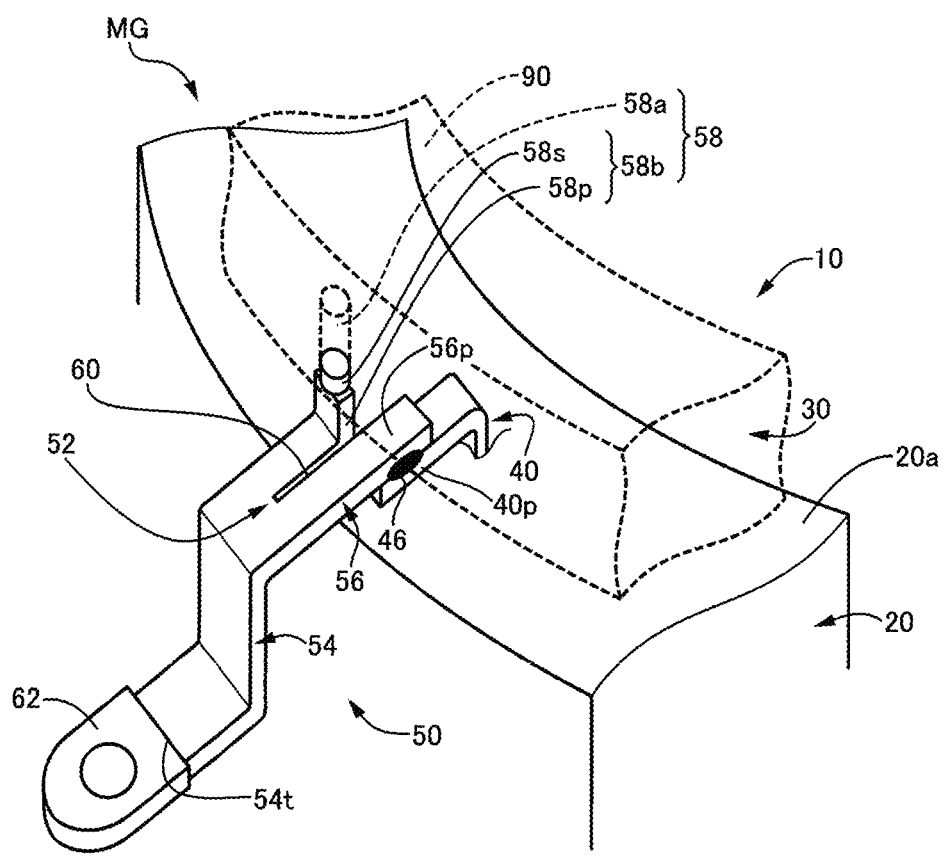
FIG. 2 is a perspective view showing a structure of a power line connecting between an external member and a leader line of coils of the stator that is shown in FIG. 1.

The stator 10 includes a stator core 20, coils 30 and a power line 50 (see FIG. 2). The stator core 20 has a cylindrical body whose center lies on the axis CL, for example. Although it is preferable that the stator core 20 has a cylindrical shape, a cross sectional shape of the stator core 20 does not necessarily have to be a circular shape, as long as the stator core 20 has a tubular shape. In an inner circumferential surface of the tubular stator core 20, there are provided a plurality of groove portions, i.e., slots 22 that are located at equal angular intervals (at intervals of 360/48 degrees in the present embodiment) around the axis CL. Each of the slots 22 has a predetermined depth in the radial direction toward an outer peripheral side of the stator 10, and extends throughout the tubular stator core 20 in a direction of the axis CL. In the present embodiment, the plurality of slots 22 consist of 48 slots 22. Each of the slots 22 is defined between a corresponding circumferentially adjacent pair of tooth portions 24 that are also located at equal angular intervals around the axis CL. The coils 30 are inserted in the slots 22 and are wound on the tooth portions 24. The tooth portions 24 constitute a part serving as electromagnets with an alternating current being caused to pass through the coils 30. The stator core 20 includes a yoke portion that is other than the tooth portions 24. The yoke portion serves as a path of magnetic field lines between the tooth portions 24 that serve as the electromagnets.

Figure 3:
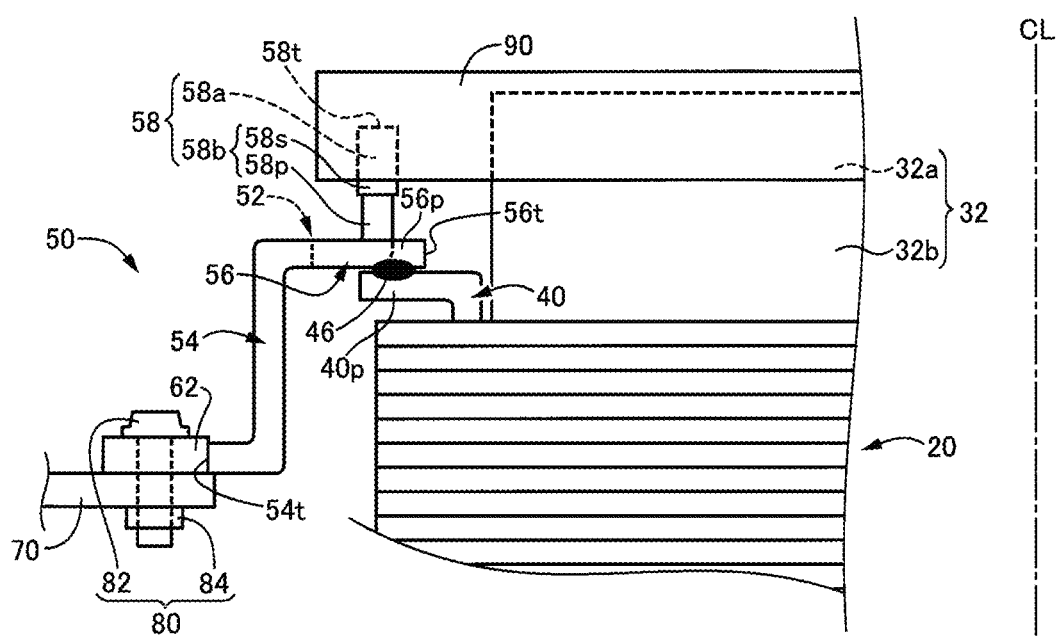
FIG. 3 is a view of the power line (shown in FIG. 2) as seen from a circumferential direction of the stator.

The coils 30 are composed of, for example, so-called rectangular conductors whose cross section perpendicular to a longitudinal direction thereof is rectangular, and are arranged in multiple numbers from an inner circumference side to an outer circumference side within each of the slots 22. The coils 30 partially protrude from the slots 22 in the direction of the axis CL, and the protruding parts of the coils 30 constitute a pair of coil ends 32, one of which is shown in FIG. 3. One of the coil ends 32 is located on a side of an axial end portion 20a of the stator core 20, while the other of the coil ends 32 is located on a side of another axial end portion 20b of the stator core 20. The coils 30 are three-phase coils for U-phase, V-phase and W-phase, for example. An end portion of each phase of the coils 30 constitutes a leader line 40 that protrudes in the direction of the axis CL and is bent in an L shape in the radial direction toward the outer peripheral side of the stator 10. The leader line 40 includes a plate portion 40p in its distal end portion, and a thickness direction of the plate portion 40p corresponds to the direction of the axis CL. In the following description, "plate portion" means a portion having a rectangular shape in a cross section perpendicular to its longitudinal direction, such that the plate portion has a first pair of mutually opposed surfaces and a second pair of mutually opposed surfaces, and such that a distance between the first pair of mutually opposed surfaces is shorter than a distance between the second pair of mutually opposed surfaces. A thickness direction of the plate portion corresponds to a direction perpendicular to the first pair of mutually opposed surfaces, while a width direction of the plate portion corresponds to a direction perpendicular to the second pair of mutually opposed surfaces. The plate portion 40p of the leader line 40 corresponds to "plate portion (included in the coil)" recited in the appended claims.

FIG. 2 is a perspective view showing a structure of the power line 50 connecting between an external member and the leader line 40 of the coils 30 shown in FIG. 1. FIG. 3 is a view of the power line 50 (shown in FIG. 2) as seen from the circumferential direction. In FIG. 2, a resin portion 90 and parts sealed by the resin portion 90 are indicated by broken lines. In FIG. 3, the parts sealed by the resin portion are indicated by broken lines. In the present embodiment, three power lines 50 are provided for the respective U, V, and W phases of a three-phase alternating current. Since the three power lines 50 are substantially the same in construction, only one of them will be described. It is noted that the power line 50 corresponds to "conductive member" recited in the appended claims.

A terminal 70, which is a conductor fixed to a terminal block (not shown), is connected to a power control unit (such as an inverter) that is configured to convert DC power supplied from a storage battery (not shown), i.e., an external power supply, into AC power, and supplies the AC power to the rotary electric machine MG so as to drive the rotary electric machine MG, and is configured to convert the AC power generated by the rotary electric machine MG, into the DC power, and stores the DC power in the storage battery. That is, the terminal 70 is connected to the external power supply for driving the rotary electric machine MG. The terminal 70 is constituted by, for example, an elongated metal plate, such that a longitudinal direction of the terminal 70 corresponds to the radial direction while a thickness direction of the terminal 70 corresponds to the direction of the axis CL. It is noted that the terminal 70 corresponds to "external member" recited in the appended claims. The "external member" means a member located outside the stator 10, and is connected to another vibration source that is other than the rotary electric machine MG. The other vibration source is, for example, a body of the vehicle 100 that is to be vibrated due to unevenness of a road surface during running of the vehicle 100.

The power line 50 includes a main line portion 54, a first branch line portion 56 and a second branch line portion 58. Each of the main line portion 54 and the first and second branch line portions 56, 58 is constituted by a conductor made of aluminum, copper or the like. It is preferable that the main line portion 54 and the first and second branch line portions 56, 58 are all constituted by an integral member (single piece) rather than being constituted by respective members separated from one another.

The main line portion 54 is, for example, an elongated metal plate that is bent. The main line portion 54 is provided with a connection terminal 62 fixed to its longitudinal end portion 54t that is located on a side of the terminal 70. In the longitudinal end portion 54t, a longitudinal direction of the main line portion 54 corresponds to the radial direction while the thickness direction of the main line portion 54 corresponds to the direction of the axis CL. The connection terminal 62 fixedly provided in the longitudinal end portion 54t is electrically connected to the terminal 70 through a fastener 80, which includes, for example, a bolt 82 and a nut 84 that is in thread engagement with the bolt 82. The thread engagement means a connection of the bolt 82 and the nut 84 which is made by screwing an external thread provided in the bolt 82 into an internal thread provided in the nut 84. The connection terminal 62 and the terminal 70 are electrically connected to each other, with the bolt 82 being inserted through a through-hole of the connection terminal 62 in the direction of the axis CL and being in thread engagement with the nut 84.

The main line portion 54 extends from the longitudinal end portion 54t, i.e., the connection terminal 62 inwardly in the radial direction, and is then bent in an L shape outwardly of the stator core 20 (i.e., upwardly in the drawing sheet of FIG. 2) in the direction of the axis CL. Further, the main line portion 54 is then bent in an L shape inwardly in the radial direction. The term "outwardly of the stator core 20" means an outward direction away from an axially center portion of the stator core 20. In another longitudinal end portion of the main line portion 54 on a side of a branch portion 52, the longitudinal direction of the main line portion 54 corresponds to the radial direction while the thickness direction of the main line portion 54 corresponds to the direction of the axis CL. Thus, with the main line portion 54 being thus bent, the longitudinal direction of the main line portion 54 is changed from the radial direction to the direction of the axis CL and is then changed back to the radial direction, as the main line portion 54 extends from the longitudinal end portion 54t to the other longitudinal end portion.

The first and second branch line portions 56, 58 are branched from the branch portion 52 that is located on a side of the other longitudinal end portion of the main line portion 54. In other words, the first and second branch line portions 56, 58 are electrically and mechanically connected to the main line portion 54 in the branch portion 52. Specifically, a slit 60 is cut through the power line 50 in the thickness direction and extends from the branch portion 52 in the longitudinal direction of the main line portion 54, such that the first and second branch line portions 56, 58 are separated from each other by the slit 60, namely, the first and second branch line portions 56, 58 are located on respective opposite sides of the slit 60. Thus, in the power line 50 that is an integral member, the first and second branch line portions 56, 58 are physically separated from each other by the slit 60 that is simple in construction. The slit 60 is formed, for example, by punching in press working, or by cutting.

The first branch line portion 56 includes a plate portion 56p that is constituted by an elongated metal plate, for example. The first branch line portion 56 extends from the branch portion 52 inwardly in the radial direction, so that the thickness direction of the first branch line portion 56 corresponds to the direction of the axis CL. The first branch line portion 56 includes a distal end portion 56t located on a side of the coils 30, and is fixed to the leader line 40 through a welded portion 46 in which a plate surface of the plate portion 56p of the distal end portion 56t and a plate surface of the plate portion 40p of the leader line 40 are welded to each other. Thus, the first branch line portion 56 is electrically connected to the leader line 40. It is noted that the welded portion 46 corresponds to "connection portion" recited in the appended claims, and that the plate portion 56p corresponds to "plate portion (included in the first branch line portion)" recited in the appended claims.

The second branch line portion 58 is constituted by an elongated metal body, for example. The second branch line portion 58 includes a distal end portion 58t that is opposite to the branch portion 52 in the longitudinal direction of the second branch line portion 58. The distal end portion 58t of the second branch line portion 58 is sealed by the resin portion 90 so as to be fixed to the resin portion 90.

The resin portion 90 is a resin sealing the distal end portion 58t of the second branch line portion 58 and a part of the coil end 32, wherein the part of the coil end 32 is remote from the stator core 20 in the direction of the axis CL. The sealing by the resin portion 90 is made by a process including: a step of setting the stator 10 (in which the distal end portion 56t of the first branch line portion 56 is welded to the leader line 40) such that the welded portion 46 is located on a lower side in a vertical direction; a step of preparing a mould defining therein a cavity; a step of injecting the resin into the cavity in a state in which the distal end portion 58t of the second branch line portion 58 and the above-described part of the coil end 32 (which are to be sealed by the resin) is introduced in the cavity, and a step of curing the resin injected in the cavity.

In the coil end 32, a sealed region 32a is a region sealed by the resin portion 90, while an unsealed region 32b is a region not sealed by the resin portion 90. The welded portion 46 is not sealed by the resin portion 90. It is noted that the sealed region 32a corresponds to "at least a part of a coil end" recited in the appended claims.

The second branch line portion 58 includes a sealed region 58a that is sealed by the resin portion 90 and an unsealed region 58b that is not sealed by the resin portion 90. It is noted that the sealed region 58a corresponds to "at least a part of the second branch line portion" and "sealed region" that are recited in the appended claims, and that the unsealed region 58b corresponds to "unsealed region" that is recited in the appended claims.

In the unsealed region 58b of the second branch line portion 58, there are a plate portion 58p and a cylindrical portion 58s. The plate portion 58p is closer than the cylindrical portion 58s to the branch portion 52, and is constituted by a metal plate having a rectangular shape in a cross section perpendicular to the longitudinal direction of the second branch line portion 58. The cylindrical portion 58s is closer than the plate portion 58p to the distal end portion 58t, and is constituted by a cylindrical metal body having a circular shape in a cross section perpendicular to the longitudinal direction of the second branch line portion 58. The sealed region 58a of the second branch line portion 58 cooperates with the cylindrical portion 58s included in the unsealed region 58b of the second branch line portion 58, namely, cooperates with a close portion of the unsealed region 58b of the second branch line portion 58 that is close to the distal end portion 58t, to integrally constitute a cylindrical metal body. The cylindrical metal body constituted by the cylindrical portion 58s and the sealed region 58a is formed, for example, by pressing the distal end portion 58t of the second branch line portion 58 and plastically deforming the distal end portion 58t. The second branch line portion 58 has a cross section (hereinafter referred to as "first cross section") in the branch portion 52, and has another cross section (hereinafter referred to as "second cross section") in a boundary between the sealed region 58a and the unsealed region 58b, such that the first and second cross sections are substantially equal in area but are different in shape. Specifically, the first cross section has a rectangular shape while the second cross section has a rounded shape. The cylindrical portion 58s has a flexural rigidity that is higher than a flexural rigidity of the plate portion 58p that corresponds to a force required to bend or elastically deform the plate portion 58p in its thickness direction (in which the elastic deformation is more likely to be caused than in other directions).

The plate portion 58p included in the unsealed region 58b of the second branch line portion 58 extends from the branch portion 52 inwardly in the radial direction, and is then bent in an L shape in the direction of the axis CL outwardly of the stator core 20. Thus, the plate portion 58p included in the unsealed region 58b of the second branch line portion 58 is bent such that the longitudinal direction of the second branch line portion 58 is changed from the radial direction to the direction of the axis CL, namely, the plate portion 58p includes a portion in which the thickness direction of the second branch line portion 58 corresponds to the direction of the axis CL and also a portion in which the thickness direction of the second branch line portion 58 corresponds to the radial direction. The unsealed region 58b of the second branch line portion 58 has a length (that corresponds to a distance from the branch portion 52 to the sealed region 58a in the longitudinal direction of the second branch line portion 58) that is smaller than a distance between the branch portion 52 and the longitudinal end portion 54t in the longitudinal direction of the main line portion 54. It is noted that the plate portion 58p corresponds to "plate portion (included in the second branch line portion)" recited in the appended claims.

In the present embodiment, the stator 10 includes: (a) the stator core 20; (b) the coils 30 wound on the stator core 20; (c) the power line 50 including: the main line portion 54 that is electrically connected in the longitudinal end portion 54t thereof with the terminal 70; and the first and second branch line portions 56, 58 that are branched from the branch portion 52 located on the side of the other longitudinal end portion of the main line portion 54, such that the first branch line portion 56 is connected to the leader line 40 of the coils 30 through the welded portion 46; and (d) the resin portion 90 that seals at least the part of the coil end 32 of the coils 30 and at least the part of the second branch line portion 58. Thus, the first branch line portion 56 is branched from the branch portion 52 that is located between the longitudinal end portion 54t of the main line portion 54 (connected to the terminal 70) and the second branch line portion 58 (sealed by the resin portion 90 and fixed to the resin portion 90), and the first branch line portion 56 is electrically connected to the leader line 40 of the coils 30 through the welded portion 46. Owing to this arrangement, as compared with an arrangement in which the power line 50 includes only the main line portion 54 which is connected in the longitudinal end portion 54t thereof to the terminal 70 and which is sealed in the other longitudinal end portion thereof by the resin portion 90, with an intermediate portion thereof between the longitudinal end portions being electrically connected to the leader line 40 of the coils 30, it is possible to suppress the force applied to the welded portion 46 in the event of vibration (particularly, in the event of vibration that is changed irregularly rather than regularly), and to accordingly assure the reliability of the electrical connection in the welded portion 46.

In the present embodiment, the second branch line portion 58 includes the sealed region 58a that is sealed by the resin portion 90 and the unsealed region 58b that is not sealed by the resin portion 90. Owing to provision of the unsealed region 58b in the second branch line portion 58, as compared with an arrangement in which the unsealed region 58b is not provided in the second branch line portion 58, the vibration is likely to be absorbed by elastic deformation of the unsealed region 58b in the in the event of the vibration so that a force applied to a surface of the resin portion 90 is likely to be made smaller. Thus, a crack is unlikely to be caused between the resin portion 90 and the second branch line portion 58 whereby an effect (i.e., so-called "anchor effect") of fixing the second branch line portion 58 to the resin portion 90 is easily maintained, so that it is possible to suppress the force applied to the welded portion 46 in the event of vibration, and to accordingly assure reliability of the electrical connection in the welded portion 46.

In the present embodiment, the unsealed region 58b in the second branch line portion 58 has the length that is smaller than the distance between the branch portion 52 and the longitudinal end portion 54t in the longitudinal direction of the main line portion 54. As compared with the terminal 70 to which the longitudinal end portion 54t of the main line portion 54 is connected, the resin portion 90 that seals the coil end 32 is likely to be moved together with the leader line 40 of the coils 30. A magnitude of vibration of the branch portion 52 relative to that of the resin portion 90 is made smaller where the length of the unsealed region 58b in the second branch line portion 58 is smaller than the distance between the branch portion 52 and the longitudinal end portion 54t in the longitudinal direction of the main line portion 54, than where the length of the unsealed region 58b in the second branch line portion 58 is not smaller than the distance between the branch portion 52 and the longitudinal end portion 54t in the longitudinal direction. Therefore, it is possible to suppress the force applied to the welded portion 46 connecting the leader line 40 of the coils 30 and the first branch line portion 56 branched from the branch portion 52, and accordingly to easily assure the reliability of the electrical connection in the welded portion 46.

In the present embodiment, the second branch line portion 58 includes the plate portion 58p located in the unsealed region 58b, and the plate portion 58p of the second branch line portion 58 is bent, such that the plate portion 58p of the second branch line portion 58 is bent such that the thickness direction of the second branch line portion 58 is changed, namely, such that the plate portion 58p includes the portions that are different from each other in terms of the thickness direction of the second branch line portion 58. The plate portion 58p is more likely to be elastically deformed in its thickness direction than its longitudinal direction and width direction. Where the plate portion 58p of the unsealed region 58b of the second branch line portion 58 is bent such that the portions of the plate portion 58p are different from each other in terms of the thickness direction, it can be said that the plate portion 58p has a plurality of thickness directions in each of which the plate portion 58p is easily deformed. Therefore, as compared with an arrangement in which the plate portion 58p is not bent, the force applied from the second branch line portion 58 to the surface of the resin portion 90 in the event of the vibration is likely to be smaller, since the plate portion 58p easily absorbs the vibration in a plurality of directions. Thus, the crack is unlikely to be caused between the resin portion 90 and the second branch line portion 58 whereby the effect of fixing the second branch line portion 58 to the resin portion 90 is easily maintained, so that it is possible to suppress the force applied to the welded portion 46 in the event of vibration, and to accordingly assure the reliability of the electrical connection in the welded portion 46.

In the present embodiment, the shape of the second cross section of the second branch line portion 58 in the boundary between the sealed region 58a and the unsealed region 58b is different from the shape of the first cross section of the second branch line portion 58 in the branch portion 52, and is rounded. Where the shape of the second cross section of the second branch line portion 58 in the boundary between the sealed region 58a and the unsealed region 58b is rounded as compared with an arrangement in which the shape of the second cross section is not rounded, it is possible to relieve stress concentration occurred due to the force applied from the second branch line portion 58 to the surface of the resin portion 90 in the event of vibration. With the stress concentration occurred on the surface of the resin portion 90 being relieved, the crack is unlikely to be caused between the resin portion 90 and the second branch line portion 58 whereby the effect of fixing the second branch line portion 58 to the resin portion 90 is easily maintained, so that it is possible to suppress the force applied to the welded portion 46 in the event of vibration, and to accordingly assure reliability of the electrical connection in the welded portion 46.

In the present embodiment, the first branch line portion 56 includes the plate portion 56p having the plate surface, the leader line 40 of the coils 30 includes the plate portion 40p having the plate surface, and the plate surface of the plate portion 56p of the first branch line portion 56 and the plate surface of the plate portion 40p of the leader line 40 of the coils 30 are electrically connected to each other through the welding. In the plate portion 56p, the plate surface can provide a larger area for connection with another member than its side surface. Where the plate portion 56p of the first branch line portion 56 and the plate portion 40p of the leader line 40 are welded in their respective plate surfaces to each other, as compared with an arrangement in which the plate portion 56p of the first branch line portion 56 and the plate portion 40p of the leader line 40 are welded in other surfaces to each other, it is possible to obtain a larger area in the welded portion 46, and to accordingly assure reliability of the electrical connection in the welded portion 46.

Second Embodiment

Figure 4:
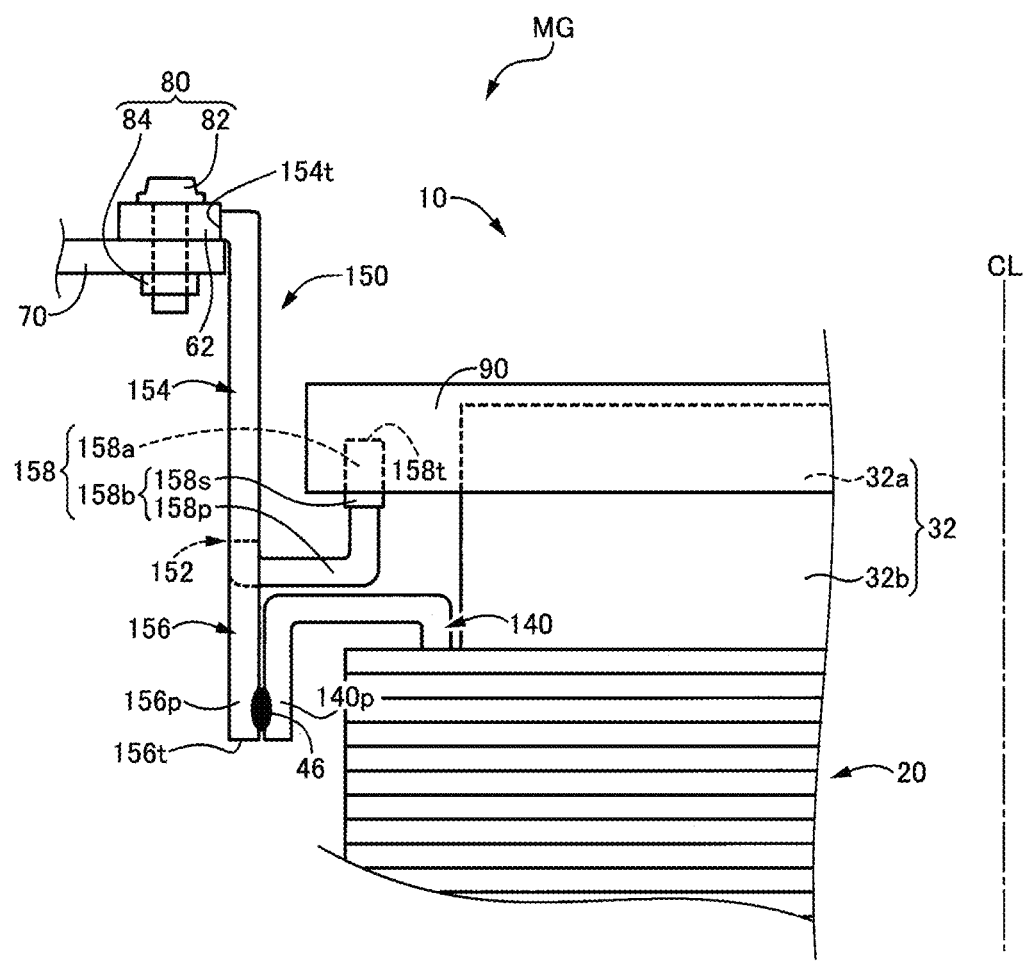
FIG. 4 is a view of a power line connecting between an external member and a leader line of coils of a stator that is constructed according to a second embodiment of the present invention.

FIG. 4 is a view of a power line 150 connecting between an external member and a leader line 140 of the coils 30 of the stator 10 that is constructed according to a second embodiment of the present invention. The view of FIG. 4 corresponds to the view of FIG. 3 that shows the above-described first embodiment. The power line 150 in this second embodiment is substantially the same as the power line 50 in the first embodiment except that the main line portion 54, first branch line portion 56 and second branch line portion 58 are replaced by a main line portion 154, a first branch line portion 156 and a second branch line portion 158. It is noted the power line 150 corresponds to "conductive member" recited in the appended claims.

An end portion of each phase of the coils 30 constitutes the leader line 140. The leader line 140, which protrudes in the direction of the axis CL, is bent in an L shape in the radial direction toward the outer peripheral side of the stator 10, and then is bent in an L shape toward the axially center portion of the stator core 20 (i.e., downward in the drawing sheet of FIG. 4). The leader line 140 includes a plate portion 140p in its distal end portion, and a thickness direction of the plate portion 140p corresponds to the radial direction. The plate portion 140p of the leader line 140 corresponds to "plate portion (included in the coil)" recited in the appended claims.

The power line 150 includes the above-described main line portion 154, first branch line portion 156 and second branch line portion 158.

The main line portion 154 is, for example, an elongated metal plate that is bent. The main line portion 154 is provided with the connection terminal 62 fixed to its longitudinal end portion 154t that is located on a side of the terminal 70. In the longitudinal end portion 154t, the longitudinal direction of the main line portion 154 corresponds to the radial direction while the thickness direction of the main line portion 154 corresponds to the direction of the axis CL. The connection terminal 62 fixedly provided in the longitudinal end portion 154t is electrically connected to the terminal 70 through the fastener 80.

The main line portion 154 extends from the longitudinal end portion 154t, i.e., the connection terminal 62 inwardly in the radial direction, and is then bent in an L shape in the direction of the axis CL toward the axially center portion of the stator core 20. In another longitudinal end portion of the main line portion 154 on a side of a branch portion 152, the longitudinal direction of the main line portion 154 corresponds to the direction of the axis CL while the thickness direction of the main line portion 54 corresponds to the radial direction. Thus, with the main line portion 154 being thus bent, the longitudinal direction of the main line portion 154 is changed from the radial direction to the direction of the axis CL, as the main line portion 154 extends from the longitudinal end portion 154t to the branch portion 152.

The first and second branch line portions 156, 158 are branched from the branch portion 152 that is located on a side of the other longitudinal end portion of the main line portion 154. In other words, the first and second branch line portions 156, 158 are electrically and mechanically connected to the main line portion 154 in the branch portion 152. Specifically, like the slit 60 in the above-described first embodiment, a slit is cut through the power line 150 in the thickness direction and extends from the branch portion 152 in the longitudinal direction of the main line portion 154, such that the first and second branch line portions 156, 158 are separated from each other by the slit, namely, the first and second branch line portions 156, 158 are located on respective opposite sides of the slit. Thus, in the power line 150 that is an integral member, the first and second branch line portions 156, 158 are physically separated from each other by the slit that is simple in construction.

The first branch line portion 156 includes a plate portion 156p that is constituted by an elongated metal plate, for example. The first branch line portion 156 extends from the branch portion 152 toward the axially center portion of the stator core 20 in the direction of the axis CL, so that the thickness direction of the first branch line portion 156 corresponds to the radial direction. The first branch line portion 156 includes a distal end portion 156t located on a side of the coils 30, and is fixed to the leader line 140 through the welded portion 46 in which a plate surface of the plate portion 156p of the distal end portion 156t and a plate surface of the plate portion 140p of the leader line 140 are welded to each other. Thus, the first branch line portion 156 is electrically connected to the leader line 140. It is noted that the plate portion 156p corresponds to "plate portion (included in the first branch line portion)" recited in the appended claims.

The second branch line portion 158 is constituted by an elongated metal body, for example. The second branch line portion 158 includes a distal end portion 158t that is opposite to the branch portion 152 in the longitudinal direction of the second branch line portion 158. The distal end portion 158t of the second branch line portion 158 is sealed by the resin portion 90 so as to be fixed to the resin portion 90.

The second branch line portion 158 includes a sealed region 158a that is sealed by the resin portion 90 and an unsealed region 158b that is not sealed by the resin portion 90. It is noted that the sealed region 158a corresponds to "at least a part of the second branch line portion" and "sealed region" that are recited in the appended claims, and that the unsealed region 158b corresponds to "unsealed region" that is recited in the appended claims.

In the unsealed region 158b of the second branch line portion 158, there region plate portion 158p and a cylindrical portion 158s. The plate portion 158p is closer than the cylindrical portion 158s to the branch portion 152, and is constituted by a metal plate. The cylindrical portion 158s is closer than the plate portion 158p to the distal end portion 158t, and is constituted by a cylindrical metal body. The sealed region 158a of the second branch line portion 158 cooperates with the cylindrical portion 158s included in the unsealed region 158b of the second branch line portion 158, namely, cooperates with a close portion of the unsealed region 158b of the second branch line portion 158 that is close to the distal end portion 158t, to integrally constitute a cylindrical metal body. The cylindrical metal body constituted by the cylindrical portion 158s and the sealed region 158a is formed, for example, by pressing the distal end portion 158t of the second branch line portion 158 and plastically deforming the distal end portion 158t. The second branch line portion 158 has a cross section (hereinafter referred to as "first cross section") in the branch portion 152, and has another cross section (hereinafter referred to as "second cross section") in a boundary between the sealed region 158a and the unsealed region 158b, such that the first and second cross sections are substantially equal in area but are different in shape. Specifically, the first cross section has a rectangular shape while the second cross section has a rounded shape. The cylindrical portion 158s has a flexural rigidity that is higher than a flexural rigidity of the plate portion 158p that corresponds to a force required to bend or elastically deform the plate portion 158p in its thickness direction (in which the elastic deformation is more likely to be caused than in other directions).

The plate portion 158p included in the unsealed region 158b of the second branch line portion 158 extends from the branch portion 152 in the direction of the axis CL toward the axially center portion of the stator core 20, and is then bent in an L shape inwardly in the radial direction. Further, the plate portion 158p is bent in an L shape in the direction of the axis CL outwardly of the stator core 20 (i.e., upward direction in the drawing sheet of FIG. 4). Thus, the plate portion 158p included in the unsealed region 158b of the second branch line portion 158 is bent such that the longitudinal direction of the second branch line portion 158 is changed from the radial direction to the direction of the axis CL, namely, the plate portion 158p includes a portion in which the thickness direction of the second branch line portion 158 corresponds to the direction of the axis CL and also a portion in which the thickness direction of the second branch line portion 158 corresponds to the radial direction. The unsealed region 158b of the second branch line portion 158 has a length (that corresponds to a distance from the branch portion 152 to the sealed region 158a in the longitudinal direction of the second branch line portion 158) that is smaller than a distance between the branch portion 152 and the longitudinal end portion 154t in the longitudinal direction of the main line portion 154. It is noted that the plate portion 158p corresponds to "plate portion (included in the second branch line portion)" recited in the appended claims.

The stator 10 according to the present second embodiment, which has the similar construction as that of the stator 10 according to the above-described first embodiment, provides substantially the same effects as the stator 10 according to the first embodiment.

Third Embodiment

Figure 5:
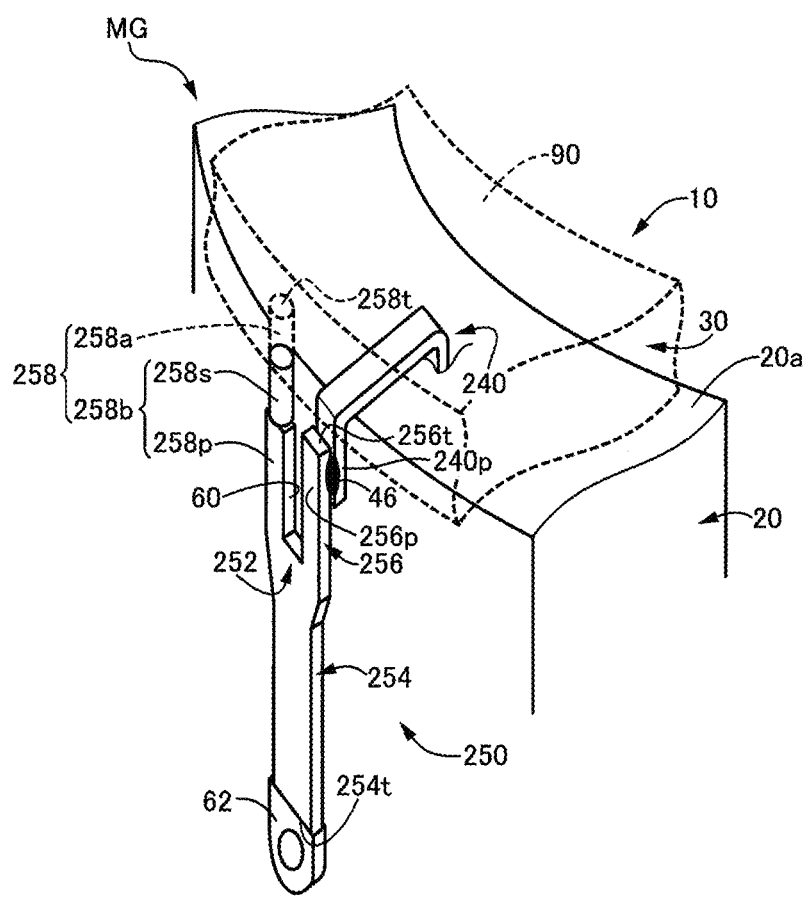
FIG. 5 is a view of a power line connecting between an external member and a leader line of coils of a stator that is constructed according to a third embodiment of the present invention.

FIG. 5 is a view of a power line 250 connecting between an external member and a leader line 240 of the coils 30 of the stator 10 that is constructed according to a third embodiment of the present invention. The view of FIG. 5 corresponds to the view of FIG. 2 that shows the above-described first embodiment. The power line 250 in this third embodiment is substantially the same as the power line 50 in the first embodiment except that the main line portion 54, first branch line portion 56 and second branch line portion 58 are replaced by a main line portion 254, a first branch line portion 256 and a second branch line portion 258. It is noted the power line 250 corresponds to "conductive member" recited in the appended claims.

An end portion of each phase of the coils 30 constitutes the leader line 240. The leader line 240, which protrudes in the direction of the axis CL, is bent in an L shape in the radial direction toward the outer peripheral side of the stator 10, and then is bent in an L shape toward the axially center portion of the stator core 20 (i.e., downward in the drawing sheet of FIG. 5). The leader line 240 includes a plate portion 240p in its distal end portion, and a thickness direction of the plate portion 240p corresponds to the radial direction. The plate portion 240p of the leader line 240 corresponds to "plate portion (included in the coil)" recited in the appended claims.

The power line 250 includes the above-described main line portion 254, first branch line portion 256 and second branch line portion 258.

The main line portion 254 is, for example, an elongated metal plate, and is provided with the connection terminal 62 fixed to its longitudinal end portion 254t that is located on a side of the terminal 70. In the longitudinal end portion 254t, the longitudinal direction of the main line portion 254 corresponds to the direction of the axis CL while the thickness direction of the main line portion 254 corresponds to the radial direction. The connection terminal 62 fixedly provided in the longitudinal end portion 254*t* is electrically connected to the terminal 70 through the fastener 80. In the fastener 80 in above-described first embodiment, the bolt 82 is inserted in the connection terminal 62 in the direction of the axis CL. However, in the fastener 80 in this third embodiment, the bolt 82 is inserted in the connection terminal 62 in the radial direction, for electrically connecting the connection terminal 62 and the terminal 70.

The main line portion 254 extends from the longitudinal end portion 254*t*, i.e., the connection terminal 62 in the direction of the axis CL outwardly of the stator core 20 (i.e., upwardly in the drawing sheet of FIG. 5).

The first and second branch line portions 256, 258 are branched from the branch portion 252 that is located on a side of the other longitudinal end portion of the main line portion 254. In other words, the first and second branch line portions 256, 258 are electrically and mechanically connected to the main line portion 254 in the branch portion 252. Specifically, the slit 60 is cut through the power line 250 in the thickness direction and extends from the branch portion 252 in the longitudinal direction of the main line portion 254, such that the first and second branch line portions 256, 258 are separated from each other by the slit 60, namely, the first and second branch line portions 256, 258 are located on respective opposite sides of the slit 60. Thus, in the power line 250 that is an integral member, the first and second branch line portions 256, 258 are physically separated from each other by the slit 60 that is simple in construction.

The first branch line portion 256 includes a plate portion 256*p* that is constituted by an elongated metal plate, for example. The first branch line portion 256 extends from the branch portion 252 outwardly of the stator core 20 in the direction of the axis CL, so that the thickness direction of the first branch line portion 256 corresponds to the radial direction. The first branch line portion 256 includes a distal end portion 256*t* located on a side of the coils 30, and is fixed to the leader line 240 through the welded portion 46 in which a plate surface of the plate portion 256*p* of the distal end portion 256*t* and a plate surface of the plate portion 240*p* of the leader line 240 are welded to each other. Thus, the first branch line portion 256 is electrically connected to the leader line 240. It is noted that the plate portion 256*p* corresponds to "plate portion (included in the first branch line portion)" recited in the appended claims.

The second branch line portion 258 is constituted by an elongated metal body, for example. The second branch line portion 258 extends from the branch portion 252 outwardly of the stator core 20 in the direction of the axis CL, so that the thickness direction of the second branch line portion 258 corresponds to the radial direction. The second branch line portion 258 includes a distal end portion 258*t* that is opposite to the branch portion 252 in the longitudinal direction of the second branch line portion 258. The distal end portion 258*t* of the second branch line portion 258 is sealed by the resin portion 90 so as to be fixed to the resin portion 90.

The second branch line portion 258 includes a sealed region 258*a* that is sealed by the resin portion 90 and an unsealed region 258*b* that is not sealed by the resin portion 90. It is noted that the sealed region 258*a* corresponds to "at least a part of the second branch line portion" and "sealed region" that are recited in the appended claims, and that the unsealed region 258*b* corresponds to "unsealed region" that is recited in the appended claims.

In the unsealed region 258*b* of the second branch line portion 258, there are a plate portion 258*p* and a cylindrical portion 258*s*. The plate portion 258*p* is closer than the cylindrical portion 258*s* to the branch portion 252, and is constituted by a metal plate. The cylindrical portion 258*s* is closer than the plate portion 258*p* to the distal end portion 258*t*, and is constituted by a cylindrical metal body. The plate portion 258*p* corresponds to "plate portion (included in the second branch line portion)" recited in the appended claims. The sealed region 258*a* of the second branch line portion 258 cooperates with the cylindrical portion 258*s* included in the unsealed region 258*b* of the second branch line portion 258, namely, cooperates with a close portion of the unsealed region 258*b* of the second branch line portion 258 that is close to the distal end portion 258*t*, to integrally constitute a cylindrical metal body. The cylindrical metal body constituted by the cylindrical portion 258*s* and the sealed region 258*a* is formed, for example, by pressing the distal end portion 258*t* of the second branch line portion 258 and plastically deforming the distal end portion 258*t*. The second branch line portion 258 has a cross section (hereinafter referred to as "first cross section") in the branch portion 252, and has another cross section (hereinafter referred to as "second cross section") in a boundary between the sealed region 258*a* and the unsealed region 258*b*, such that the first and second cross sections are substantially equal in area but are different in shape. Specifically, the first cross section has a rectangular shape while the second cross section has a rounded shape. The cylindrical portion 258*s* has a flexural rigidity that is higher than a flexural rigidity of the plate portion 258*p* that corresponds to a force required to bend or elastically deform the plate portion 258*p* in its thickness direction (in which the elastic deformation is more likely to be caused than in other directions).

The unsealed region 258*b* of the second branch line portion 258 has a length (that corresponds to a distance from the branch portion 252 to the sealed region 258*a* in the longitudinal direction of the second branch line portion 258) that is smaller than a distance between the branch portion 252 and the longitudinal end portion 254*t* in the longitudinal direction of the main line portion 254.

In this third embodiment, unlike in the above-described first and second embodiments, the power line 250 is bent neither in the main line portion 254 nor in the second branch line portion 258. Although the power line 250 is not bent, the first branch line portion 256 is branched from the branch portion 252 that is located between the longitudinal end portion 254*t* of the main line portion 254 (which is connected to the terminal 70) and the second branch line portion 258 sealed by the resin portion 90 and fixed to the resin portion 90, and the first branch line portion 256 is electrically connected to the leader line 240 of the coils 30 through the welded portion 46. Owing to this arrangement, as compared with an arrangement in which the power line 250 includes only a main line portion which is connected in a longitudinal end portion thereof to the terminal 70 and which is sealed in another longitudinal end portion thereof by the resin portion 90, with an intermediate portion thereof between the longitudinal end portions being electrically connected to the leader line of the coils 30, it is possible to suppress a force applied to the welded portion 46 connecting the first branch line portion 256 and the leader line 240 in the event of vibration, and to accordingly assure reliability of the electrical connection in the welded portion 46.

The stator 10 according to the present third embodiment, which has the similar construction as that of the stator 10 according to the above-described first embodiment, provides substantially the same effects as the stator 10 according to the first embodiment.

While the preferred embodiments of this invention have been described in detail by reference to the drawings, it is to be understood that the invention may be otherwise embodied.

In the first through third embodiments, the second branch line portion (58; 158; 258) includes the sealed region (58*a*; 158*a*; 258*a*) and the unsealed region (58*b*; 158*b*; 258*b*). However, this arrangement is not essential for the invention. For example, the second branch line portion (58; 158; 258) may not include the unsealed region (58*b*; 158*b*; 258*b*), as long as including the sealed region (58*a*; 158*a*; 258*a*). That is, the second branch line portion (58; 158; 258) may be sealed at its entirety by the resin portion 90.

In the first through third embodiments, the length of the unsealed region (58*b*; 158*b*; 258*b*) of the second branch line portion (58; 158; 258) is smaller than the distance between the branch portion (52; 152; 252) and the longitudinal end portion (54*t*; 154*t*; 254*t*) of the main line portion (54; 154; 254) in the longitudinal direction. However, this arrangement is not essential.

In the above-described first and second embodiments, the second branch line portion (58; 158) includes the plate portion (58*p*; 158*p*) located in the unsealed region (58*b*; 158*b*), and the plate portion (58*p*; 158*p*) is bent, such that the plate portion (58*p*; 158*p*) includes a portion in which the thickness direction of the second branch line portion (58; 158) corresponds to the direction of the axis CL and also a portion in which the thickness direction of the second branch line portion (58; 158) corresponds to the radial direction. However, this arrangement is not essential. For example, the plate portion (58*p*; 158*p*) may be bent, such that the plate portion (58*p*; 158*p*) includes a portion in which the thickness direction of the second branch line portion (58; 158) corresponds to one of the direction of the axis CL and the radial direction and also a portion in which the thickness direction of the second branch line portion (58; 158) does not correspond to the one of the direction of the axis CL and the radial direction. In this arrangement, too, as compared with an arrangement in which the plate portion (58*p*; 158*p*) is not bent, it is possible to reduce a force applied from the second branch line portion (58; 158) to a surface of the resin portion (90) in the event of vibration, because there are a plurality of directions in which the plate portion (58*p*; 158*p*) easily absorb the vibration.

In the above-described first through third embodiments, the second branch line portion (58; 158; 258) has the first cross section in the branch portion (52; 152; 252) and has the second cross section in the boundary between the sealed region (58*a*; 158*a*; 258*a*) and the unsealed region (58*b*; 158*b*; 258*b*), wherein the first cross section has the rectangular shape while the second cross section has the rounded shape. However, this arrangement is not essential. For example, the second cross section of the second branch line portion (58; 158; 258) boundary between the sealed region (58*a*; 158*a*; 258*a*) and the unsealed region (58*b*; 158*b*; 258*b*) may be an elliptical shape or a rectangular shape with chamfered corners. It is possible to relieve stress concentration occurred due to a force applied from the second branch line portion (58; 158; 258) to a surface of the resin portion (90) in the event of vibration, as long as the shape of the second cross section of the second branch line portion (58; 158; 258) boundary between the sealed region (58*a*; 158*a*; 258*a*) and the unsealed region (58*b*; 158*b*; 258*b*) is rounded as compared with the shape of the first cross section of the second branch line portion (58; 158; 258) in the branch portion (52; 152; 252). The term "rounded" means that an angular shape is adapted to be approximated to a rounded shape for relieving the stress concentration occurred due to the force applied from the second branch line portion (58; 158; 258) to the surface of the resin portion (90). Further, the second cross section of the second branch line portion (58; 158; 258) boundary between the sealed region (58*a*; 158*a*; 258*a*) and the unsealed region (58*b*; 158*b*; 258*b*) does not necessarily have to be rounded as compared with the shape of the first cross section of the second branch line portion (58; 158; 258) in the branch portion (52; 152; 252).

In the above-described first through third embodiments, the second branch line portion (58; 158; 258) includes the plate portion (58*p*; 158*p*; 258*p*). However, this arrangement is not essential. For example, the second branch line portion (58; 158; 258) may be constituted by a cylindrical metal body between the branch portion (52; 152; 252) and the distal end portion (58*t*; 158*t*; 258*t*).

In the above-described first through third embodiments, the first branch line portion (56; 156; 256) includes the plate portion (56*p*; 156*p*; 256*p*), and the leader line (40; 140; 240) of the coils (30) includes the plate portion (40*p*; 140*p*; 240*p*), such that the plate surface of the plate portion (56*p*; 156*p*; 256*p*) of the first branch line portion (56; 156; 256) and the plate surface of the plate portion (40*p*; 140*p*; 240*p*) of the leader line (40; 140; 240) are electrically connected to each other through the welded portion (46). However, this arrangement is not essential. For example, the plate surface of the plate portion (56*p*; 156*p*; 256*p*) of the first branch line portion (56; 156; 256) and a side surface of the plate portion (40*p*; 140*p*; 240*p*) of the leader line (40; 140; 240) may be electrically connected.

In the above-described first through third embodiments, the first branch line portion (56; 156; 256) includes the plate portion (56*p*; 156*p*; 256*p*). However, this arrangement is not essential. For example, the first branch line portion (56; 156; 256) may be constituted by a cylindrical metal body between the branch portion (52; 152; 252) and the distal end portion (56*t*; 156*t*; 256*t*).

In the above-described first through third embodiments, two branch line portions, i.e., the first branch line portion (56; 156; 256) and the second branch line portion (58; 158; 258) are branched from the branch portion (52; 152; 252). However, for example, three branch line portions may be branched from the branch portion (52; 152; 252). In this case, one or two of the three branch line portions may be electrically connected to the coils 30 while two or one of the three branch line portions may be sealed by the resin portion 90.

In the above-described first through third embodiments, the rotary electric machine MG is a motor generator serving as a drive power source for driving the vehicle 100. However, this arrangement is not essential. For example, the rotary electric machine MG may be a rotary electric machine for driving the vehicle 10 wherein the rotary electric machine has only a function serving as an electric motor without a function serving as an electric power generator, or may be an electric power generator for regeneration wherein the electric power generator has only a function serving as an electric power generator without a function serving as an electric motor.

It is to be understood that the embodiments described above are given for illustrative purpose only, and that the present invention may be embodied with various modifications and improvements which may occur to those skilled in the art.

NOMENCLATURE OF ELEMENTS

10: stator
20: stator core

30: coils
32: coil end
32*a*: sealed region (at least a part of coil end)
40*p*; 140*p*; 240*p*: plate portion (plate portion included in coil)
46: welded portion (connection portion)
50; 150; 250: power line (conductive member)
52; 152; 252: branch portion
54; 154; 254: main line portion
56*p*; 156*p*; 256*p*: plate portion (plate portion included first branch line portion)
54*t*; 154*t*; 254*t*: longitudinal end portion
56; 156; 256: first branch line portion
58; 158; 258: second branch line portion
58*a*; 158*a*; 258*a*: sealed region (at least a part of second branch line portion, sealed region)
58*b*; 158*b*; 258*b*: unsealed region (unsealed region)
58*p*; 158*p*; 258*p*: plate portion (plate portion included in second branch line portion)
70: terminal (external member)
90: resin portion
MG: rotary electric machine

What is claimed is:

1. A stator for a rotary electric machine, the stator comprising:
    a stator core;
    a coil wound on the stator core;
    a conductive member including: a main line portion that is electrically connected in a longitudinal end portion thereof with an external member; and first and second branch line portions that are branched from a branch portion located on a side of another longitudinal end portion of the main line portion, such that the first branch line portion is connected to the coil through a connection portion; and
    a resin portion that seals at least a part of a coil end of the coil and at least a part of the second branch line portion.

2. The stator according to claim 1,
    wherein the second branch line portion includes a sealed region that is sealed by the resin portion and an unsealed region that is not sealed by the resin portion.

3. The stator according to claim 2,
    wherein the unsealed region in the second branch line portion has a length that is smaller than a distance between the branch portion and the longitudinal end portion in a longitudinal direction of the main line portion.

4. The stator according to claim 2,
    wherein the second branch line portion includes a plate portion located in the unsealed region, and
    wherein the plate portion of the second branch line portion is bent such that the plate portion includes portions that are different from each other in terms of a thickness direction of the second branch line portion.

5. The stator according to claim 2,
    wherein the second branch line portion has a first cross section in the branch portion, and has a second cross section in a boundary between the sealed region and the unsealed region, such that the first and second cross sections are different from each other in shape, and such that the second cross section has a rounded shape.

6. The stator according to claim 1,
    wherein the first branch line portion includes a plate portion having a plate surface,
    wherein the coil includes a plate portion having a plate surface, and
    wherein the plate surface of the plate portion of the first branch line portion and the plate surface of the plate portion of the coil are electrically connected to each other through welding.

* * * * *